US012322356B2

(12) United States Patent
Oh et al.

(10) Patent No.: US 12,322,356 B2
(45) Date of Patent: Jun. 3, 2025

(54) SOURCE DRIVER INTEGRATED CIRCUIT AND METHOD FOR DRIVING THE SAME

(71) Applicant: LX SEMICON CO., LTD., Daejeon (KR)

(72) Inventors: Woong Jin Oh, Daejeon (KR); Yong Min Kim, Daejeon (KR); Kwang Jun Lee, Daejeon (KR)

(73) Assignee: LX SEMICON CO., LTD., Daejeon (KR)

( * ) Notice: Subject to any disclaimer, the term of this patent is extended or adjusted under 35 U.S.C. 154(b) by 0 days.

(21) Appl. No.: 18/526,004

(22) Filed: Dec. 1, 2023

(65) Prior Publication Data

US 2024/0185814 A1 Jun. 6, 2024

(30) Foreign Application Priority Data

Dec. 1, 2022 (KR) ........................ 10-2022-0165697

(51) Int. Cl.
*G09G 3/36* (2006.01)
*G09G 3/3275* (2016.01)

(52) U.S. Cl.
CPC ......... *G09G 3/3685* (2013.01); *G09G 3/3275* (2013.01); *G09G 2310/0291* (2013.01); *G09G 2310/0297* (2013.01); *G09G 2370/10* (2013.01)

(58) Field of Classification Search
CPC .. G09G 3/3685; G09G 3/3275; G09G 3/3688; G09G 2310/0291; G09G 2310/0297; G09G 2310/0294; G09G 2310/08
See application file for complete search history.

(56) References Cited

U.S. PATENT DOCUMENTS 10,467,975 B2 * 11/2019 Suh ...................... G09G 3/3648
10,762,839 B2 * 9/2020 Bae ....................... G06F 3/0416
2009/0058194 A1 * 3/2009 Lee ...................... G09G 3/3685
307/130

(Continued)

FOREIGN PATENT DOCUMENTS

CN 114242009 A 3/2022

OTHER PUBLICATIONS

Partial European Search Report issued for the European Patent Application No. 23213353.8 on Apr. 3, 2024, 24 pages.

(Continued)

*Primary Examiner* — Xuemei Zheng
(74) *Attorney, Agent, or Firm* — ROTHWELL, FIGG, ERNST & MANBECK, P.C.

(57) ABSTRACT

Disclosed is a source driver IC including a first latch circuit configured to sample image data, a second latch circuit configured to latch and output the sampled image data at a rising edge of a latch enable signal, a latch enable signal output control circuit configured to output the latch enable signal at a first timing or second timing according to a timing setting signal, a digital-to-analog converter configured to convert the image data into an analog data voltage, an output buffer circuit configured to amplify and output the data voltage in synchronization with the latch enable signal, and a Mux circuit configured to be turned on during a period of a low level of a source output enable signal to output the data voltage to each channel.

18 Claims, 12 Drawing Sheets

(56) References Cited

U.S. PATENT DOCUMENTS

| | | | | |
|---|---|---|---|---|
| 2013/0285998 | A1* | 10/2013 | Hong | G06F 3/038 345/212 |
| 2015/0325214 | A1* | 11/2015 | Ryu | G09G 3/3688 345/99 |
| 2017/0193892 | A1 | 7/2017 | Ha | |
| 2021/0020135 | A1 | 1/2021 | Yang et al. | |
| 2021/0193074 | A1* | 6/2021 | Kim | G09G 3/3208 |

OTHER PUBLICATIONS

Extended European Search Report issued for the European Ptent Application No. EP23213353.8 dated Jul. 26, 2024, 30 pages.

* cited by examiner

SOURCE DRIVER INTEGRATED CIRCUIT AND METHOD FOR DRIVING THE SAME

Pursuant to 35 U.S.C. § 119(a), this application claims the benefit of earlier filing date and right of priority to Korean Application No. 10-2022-0165697, filed on Dec. 1, 2022, the contents of which are hereby incorporated by reference herein in their entirety.

BACKGROUND OF THE DISCLOSURE

Field of the Disclosure

The present disclosure relates to a display device, and more particularly, to a source driver integrated circuit and a method for driving the same.

Discussion of the Related Art

With the development of the information society, the demand for display devices that display images is increasing in various forms. In response to these demands, various types of display devices including conventional liquid crystal display devices (LCD) and organic light emitting display devices (OLEDs) have been utilized.

Such display devices have a source driver integrated circuit (IC) to supply data voltage to the data lines of a display panel, a gate driver IC to sequentially supply gate pulses (or scan pulses) to the gate lines (or scan lines) of the display panel, and a timing controller to control the source driver IC and the gate driver IC.

A general source driver IC includes a shift register, a sampling latch, a holding latch, a level shifter, a digital-to-analog converter, an output buffer circuit, and a MUX circuit to output a data voltage to the data lines.

However, in the case of a general source driver IC, after the output level of the data voltage through the output buffer circuit is changed, the switching device of the MOSFET circuit is turned on and the data voltage is output to each channel of the display panel. As a result, noise caused by the voltage difference between the input terminal of the MOSFET circuit connected to the output buffer circuit and the output terminal of the MOSFET circuit connected to the data line corresponding to each channel, i.e., power noise or ground noise, increases.

In addition, in the case of general source driver ICs, since the switching device in the MUX circuit always operates in a turn-on state when operating in the driving mode, charge-sharing (C/S), which requires the switching device in the MUX circuit to be turned off, cannot be performed, and therefore low-power functions cannot be realized.

SUMMARY OF THE DISCLOSURE

An object of the present disclosure devised to solve the above-mentioned problems is to provide a source driver integrated circuit (IC) capable of varying the output timing of a latch-enable signal according to the noise of a digital-to-analog converter and the noise of a MUX circuit, and a method for driving the same.

Another object of the present disclosure is to provide a source driver IC capable of performing charge sharing even in a driving mode, and a method for driving the same.

To achieve these objects and other advantages and in accordance with the purpose of the disclosure, as embodied and broadly described herein, a source driver integrated circuit (IC) may include a first latch circuit configured to sample image data, a second latch circuit configured to latch the sampled image data and simultaneously output the same at a rising edge of a latch enable signal, a latch enable signal output control circuit configured to output the latch enable signal at a first timing or at a second timing different from the first timing according to a timing setting signal, a digital-to-analog converter configured to convert the image data simultaneously output from the second latch circuit into an analog data voltage, an output buffer circuit configured to amplify and output the data voltage in synchronization with the latch enable signal, and a multiplexer (Mux) circuit configured to be turned on during a period of a low level of a source output enable signal to output the data voltage output from the output buffer circuit to each of channels, wherein the second timing may be a time at which the output buffer circuit outputs the data voltage after the time at which the Mux circuit is turned on.

In another aspect of the present disclosure, a method for driving a source driver integrated circuit (IC) may include receiving image data and a timing setting signal by a reception circuit, sampling the image data by a first latch circuit, outputting, by a latch enable signal output control circuit, a latch enable signal at a first timing when a timing setting signal has a first value, or at a second timing different from the first timing when the timing setting signal has a second value, outputting, by a second latch circuit, the image data in synchronization with a rising edge of the latch enable signal output at the first timing or the second timing, converting, by a digital-to-analog converter, the image data output from the second latch circuit into an analog data voltage, amplifying and outputting, by an output buffer circuit, the data voltage in synchronization with the rising edge of the latch enable signal, and turned on a multiplexer (Mux) circuit during a period of a low level of a source output enable signal to output the data voltage output from the output buffer circuit to each of channels, wherein the second timing may be a time at which the output buffer circuit outputs the data voltage after the time at which the Mux circuit is turned on.

According to the present disclosure, when the noise of the digital-to-analog converter is greater than the power noise of the Mux circuit, the noise of the digital-to-analog converter may be reduced by synchronizing the output timing of the latch enable signal with the rising edge of the source output enable signal or the time when the last image data of the previous horizontal line is received. Also, when the power noise of the mux circuit is greater than the noise of the digital-to-analog converter, the power noise of the latch enable signal may be reduced by synchronizing the output timing of the latch enable signal with the falling edge of the source output enable signal.

In addition, according to the present disclosure, when the source driver IC operates in a driving mode in an ARC drive type, the Mux circuit can be turned off during a period when the source output enable signal is at a high level, and thus charge sharing may be performed, which may enable low power operation.

Effects obtainable from the present disclosure may be non-limited by the above-mentioned effects. And, other unmentioned effects can be clearly understood from the following description by those having ordinary skill in the technical field to which the present disclosure pertains.

BRIEF DESCRIPTION OF THE DRAWINGS

The present disclosure will become more fully understood from the detailed description given herein below and the accompanying drawings, which are given by illustration only, and thus are not limitative of the present invention.

DETAILED DESCRIPTION OF THE DISCLOSURE

Figure 1:
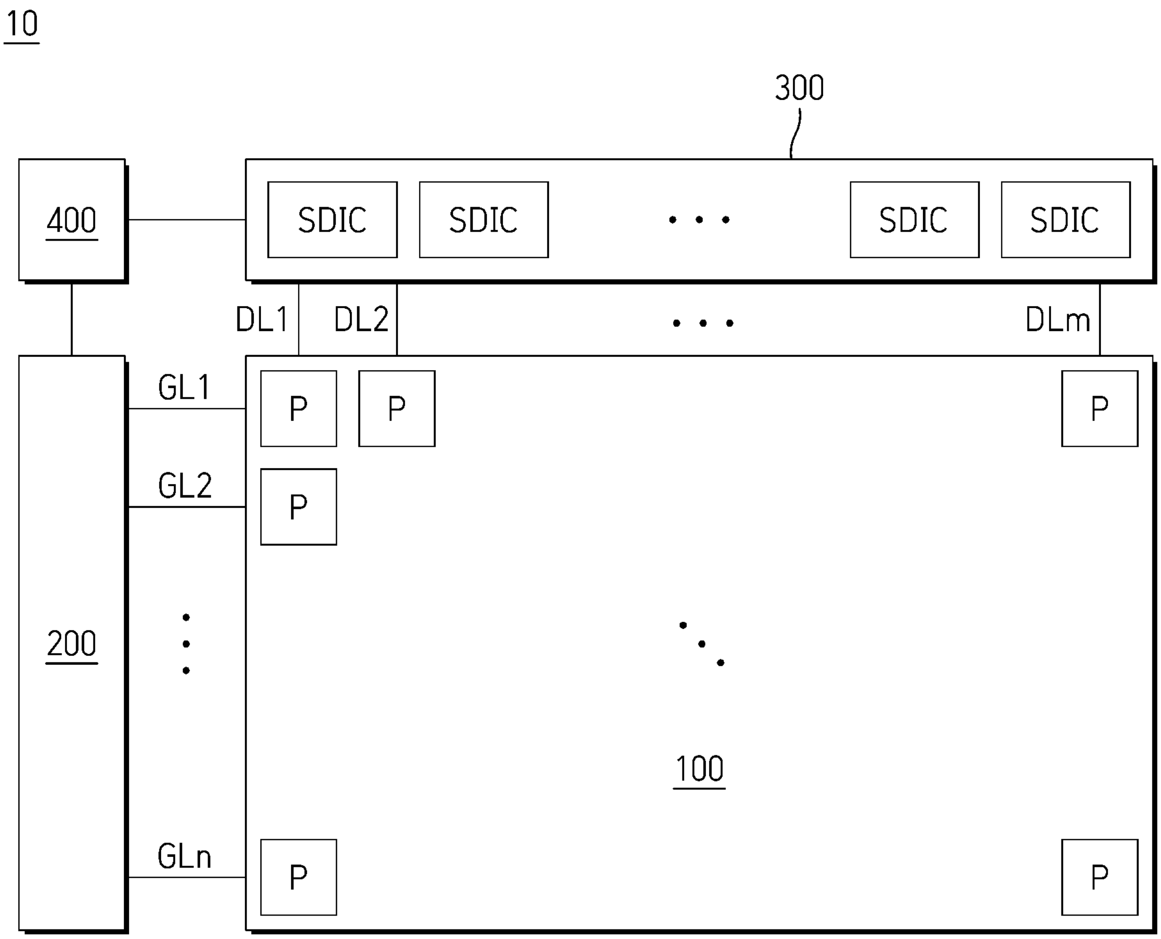
FIG. 1 is a diagram illustrating a configuration of a display device to which a source driver IC according to one embodiment of the present disclosure is applied.

Throughout the specification, like reference numerals are used to refer to substantially the same components. In the following description, detailed descriptions of components and features known in the art may be omitted if they are not relevant to the core configuration of the present disclosure. The meanings of terms used in this specification are to be understood as follows.

The advantages and features of the present disclosure, and methods of achieving them, will become apparent from the detailed description of the embodiments, together with the accompanying drawings. However, the present disclosure is not limited to the embodiments disclosed herein and will be implemented in many different forms. The embodiments are provided merely to make the disclosure of the present invention thorough and to fully inform one of ordinary skill in the art to which the present disclosure belongs of the scope of the invention. It is to be noted that the scope of the present disclosure is defined only by the claims.

The figures, dimensions, ratios, angles, numbers of elements given in the drawings are merely illustrative and are not limiting. Like reference numerals refer to like elements throughout the specification. Further, in describing the present disclosure, descriptions of well-known technologies may be omitted in order to avoid obscuring the gist of the present disclosure.

As used herein, the terms "includes," "has," "comprises," and the like should not be construed as being restricted to the means listed thereafter unless specifically stated otherwise. As used herein, the singular forms "a", "an", and "the" are intended to include the plural forms as well, unless the context clearly indicates otherwise.

Elements are to be interpreted a margin of error, even if not explicitly stated otherwise.

For example, when a positional relationship between two parts is described using terms such as "on top of", "on", "under", "next to", etc., one or more other parts may be positioned between the two parts, unless "immediately" or "directly" is used.

In describing temporal relationships, terms such as "after," "subsequent to," "next to," "before," and the like may include cases where any two events are not consecutive, unless the term "immediately" or "directly" is explicitly used.

While the terms first, second, and the like are used to describe various elements, the elements are not limited by these terms. These terms are used merely to distinguish one element from another. Accordingly, a first element referred to herein may be a second element within the technical idea of the present disclosure.

The terms "the X-axis direction," "the Y-axis direction," and "the Z-axis direction" are not to be construed solely as perpendicular to one another in terms of geometric relationship, but may refer to a wider range of directionality to the extent that the components of the present disclosure are capable of functioning.

It should be understood that the term "at least one" includes all possible combinations of one or more related items. For example, the phrase "at least one of the first, second, and third items" can mean each of the first, second, or third items, as well as any possible combination of two or more of the first, second, and third items.

Features of various embodiments of the present disclosure can be partially or fully combined. As will be clearly appreciated by those skilled in the art, various interactions and operations are technically possible. Embodiments can be practiced independently of each other or in conjunction with each other.

Hereinafter, embodiments of the present disclosure will be described in detail with reference to the accompanying drawings.

FIG. 1 is a diagram illustrating a configuration of a display device to which a source driver integrated circuit (IC) according to one embodiment of the present disclosure is applied.

The display device 10 shown in FIG. 1 is an electronic device including a source driver IC (SDIC) according to the present disclosure, and may be any kind of display device that uses a voltage from a battery or external power source as an operating voltage, for example. Specifically, the display device 10 may be a TV, mobile, monitor, laptop, or the like.

Referring to FIG. 1, the display device 10 includes a display panel 100 and a gate driver 200, a source driver 300, and a timing controller 400 configured to drive the display panel 100.

The display panel 100 includes data lines DL1 to DLm, gate lines GL1 to GLn intersecting the data lines DL1 to DLm, and pixels P disposed in a matrix defined by the data lines DL1 to DLm and the gate lines GL1 to GLn.

The data lines DL1 to DLm supply the pixels P with data signals (also referred to as data voltages) input from the source driver 300. The gate lines GL1 to GLn supply the pixels P with gate signals input from the gate driver 200.

In one embodiment, the display panel 100 according to the present disclosure may be a liquid crystal display (LCD) panel. In this case, each pixel P may include at least one switching transistor TFT, at least one capacitor, and a liquid crystal layer between glass substrates.

In other embodiments, the display panel 100 may be an organic light emitting diode (OLED) display panel.

The gate driver 200 supplies gate signals to the pixels P via the gate lines GL1 to GLn. The gate driver 200 includes a shift register configured to output a gate pulse synchronized with a data signal in response to a gate timing control signal input from the timing controller 400.

The gate timing control signal includes a gate start pulse and a gate shift clock. The shift register shifts the gate start pulse according to the gate shift clock timing to cause the gate pulses to be supplied sequentially to the gate lines GL.

The switching transistors included in the respective pixels P of the display panel 100 are turned on according to the gate pulse to select the data line DL of the display panel 100 through which the data signal is input. In this case, the shift register included in the gate driver 200 may be formed directly on the substrate of the display panel 100 by the same process as the transistor array of the pixel array.

The source driver 300 supplies the data voltage for the image to be displayed through the display panel 100 to the data lines DL. To this end, the source driver IC 300 may include a plurality of source driver ICs (SDICs).

The timing controller 400 controls the operation of the gate driver 200 and the source driver 300. In one embodiment, the timing controller 400 may generate a data timing control signal (DCS) to control the operation of the source driver 300 or a gate timing control signal (GCS) to control the operation of the gate driver 200 from timing signals including a vertical synchronization signal Vsync, a horizontal synchronization signal Hsync, a clock signal CLK, and a data enable signal DE.

The data timing control signal may include a source start pulse (SSP), a source sampling clock (SSC), and a source output enable signal (SOE), and the gate timing control signal may include a gate start pulse (GSP), a gate shift clock (GSC), and a gate output enable signal.

Here, the SSP controls the data sampling start timing of the source driver 300. The SSC is a clock signal that controls the sampling timing of data in the source driver 300. The SOE controls the output timing of the data voltage.

The GSP controls the start timing of the operation of the gate driver 200. The GSC is a clock signal input to the gate driver 200. It controls the shift timing of the gate pulse. The gate output enable signal specifies the timing information about the gate driver 200.

The SDICs included in the source driver 300 converts the image data (RGB DATA or RGB) for each channel input from the timing controller 400 into an analog data voltage, and supplies the converted data voltage to each pixel P of the display panel 100 via the data lines DL according to the data timing control signal input from the timing controller 400.

In particular, the SDICs according to the present disclosure may vary the output timing of the latch enable signal for enabling the second latch circuit in order to reduce power noise caused by a difference in voltage between the input and output terminals of the Mux circuit that outputs the data voltage in synchronization with the source output enable signal (SOE).

Since the power noise caused by the difference in voltage between the input and output terminals of the Mux circuit results from the difference between the timing at which the Mux circuit is turned on and outputs the data voltage and the timing at which the output buffer circuit outputs the data voltage, the present disclosure is intended to minimize the time difference between the data voltage output timing of the output buffer circuit and the data voltage output timing of the Mux circuit by adjusting the output timing of the latch enable signal of the second latch circuit.

In addition, a general SDIC has the limitation that when the SDIC operates in a driving mode, it cannot perform a charge sharing operation because the Mux circuit is always maintained in a turn-on state, which makes it difficult to accomplish a low-power implementation. However, the SDIC according to the present disclosure can perform the charge sharing operation by outputting the latch enable signal of the second latch circuit in synchronization with the falling edge of the SOE to turn off the Mux circuit during the period during which the SOE is at a high level. Accordingly, the present disclosure may achieve a low-power implementation of an SDIC.

Hereinafter, features of the SDIC according to the present disclosure will be described in more detail with reference to FIGS. 2 to 6.

Figure 2:
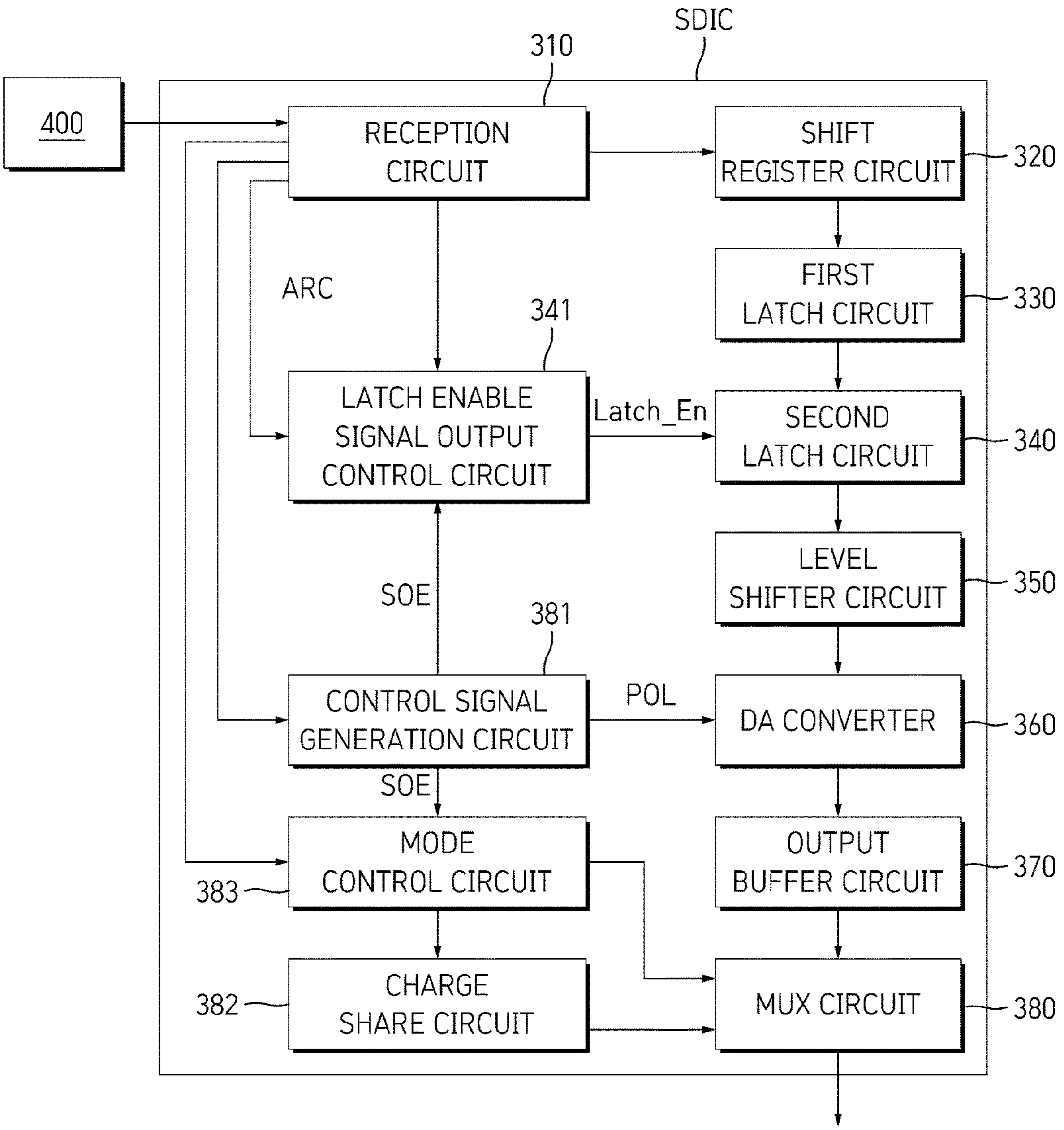
FIG. 2 is a block diagram schematically illustrating a configuration of a source driver IC according to one embodiment of the present disclosure.

FIG. 2 is a block diagram schematically illustrating a configuration of a source driver IC according to one embodiment of the present disclosure.

As shown in FIG. 2, an SDIC according to one embodiment of the present disclosure includes a reception circuit 310, a shift register circuit 320, a first latch circuit 330, a second latch circuit 340, a latch enable signal output control circuit 341, a level shifter circuit 350, a digital-to-analog (DA) converter 360, an output buffer circuit 370, a Mux circuit 380, a control signal generation circuit 381, a charge share circuit 382, and a mode control circuit 383.

The reception circuit 310 communicates with the timing controller 400 to receive image data (RGB data) and various control signals from the timing controller 400.

For example, when the timing controller 400 and the SDIC 300 use an interface such as mini-LVDS, the reception circuit 310 may receive various data control signals (DCS) and image data (RGB data) from the timing controller 400. Also, when the timing controller 400 and the SDIC 300 use clock embedded differential signaling (CEDS), which is an embedded clock type interface, the reception circuit 310 may receive a preamble packet, a control packet, an image data (RGB data) packet, and the like.

In one embodiment, the reception circuit 310 may receive, from the timing controller 400, a timing setting signal (or AMP Refresh Control (ARC)) for setting the output timing of the latch enable signal of the second latch circuit 340 to either a first timing or a second timing. Here, the first timing may be a timing set to a default value, and the SDIC may maintain the output timing of the latch enable signal as the first timing or change the first timing to the second timing based on the timing setting signal (ARC) received through the reception circuit 310.

In one embodiment, the timing setting signal (ARC) may be implemented in the form of a flag having a first value or a second value as information about maintaining or changing the output timing of the latch enable signal. For example, when the timing setting signal (ARC) is a flag having the first value, the output timing of the latch enable signal may be set as the first timing. When the timing setting signal (ARC) is a flag having the second value, the output timing of the latch enable signal may be set as the second timing.

Hereinafter, an operation type in which the reception circuit 310 receives a timing setting signal (ARC) having the first value and the output timing of the latch enable signal is set as the first timing will be defined as a normal operation type. Further, an operation type in which the reception circuit 310 receives the timing setting signal (ARC) having the second value and the output timing of the latch enable signal is set as the second timing will be defined as an ARC operation type.

In the above-described embodiment, the timing setting signal (ARC) may be received from the timing controller 400 in a control packet transmitted in a clock embedded differential signaling (CEDS) manner. In other embodiments, the timing setting signal (ARC) may be received from the timing controller 400 via a separate pin formed on the SDIC.

The reception circuit 310 may receive, from the timing controller 400, an operation mode control signal that determines the operation mode of the SDIC under the normal operation type or the ARC operation type. In one embodiment, the operation mode may include a charge-sharing (C/S) mode, a Hi-Z mode, and a driving mode.

Accordingly, the SDIC may operate in the C/S mode, the Hi-Z mode, and the driving mode according to the operation mode control signal under the normal operation type, and may operate in the C/S mode, the Hi-Z mode, and the driving mode under the ARC operation type.

Figure 3:
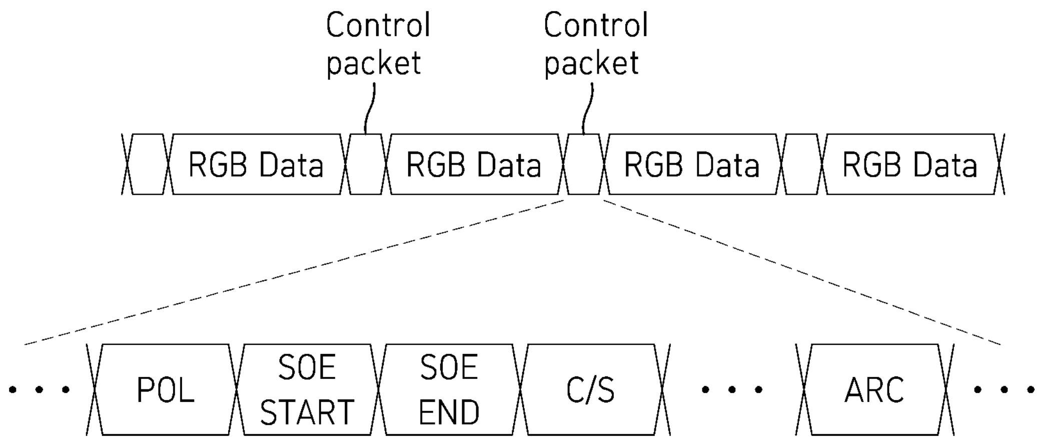
FIG. 3 is a diagram illustrating an example of signals included in a control packet received by a source driver IC according to one embodiment of the present disclosure.

FIG. 3 is a diagram illustrating an example of signals included in a control packet received by a source driver IC according to one embodiment of the present disclosure.

As shown in FIG. 3, when the SDIC and the timing controller 400 according to the present disclosure use CEDS-based interface communication, an input packet received from the timing controller 400 may include a control packet and an image data (RGB data) packet. The control packet may include POL, SOE_Start, SOE_END, C/S, PWRC, and a timing setting signal (ARC).

For example, POL corresponds to the timing information about a polarity control signal, SOE_Start and SOE_End are information for specifying the rising and falling times of the SOE, C/S is control information indicating whether charge sharing is performed when operating in the driving mode in the ARC operation type, and PWRC is control information about the power control circuit. In particular, the timing setting signal (ARC) is a signal for setting the output timing of the latch enable signal Latch_En as either the first timing or the second timing, as described above.

Referring back to FIG. 2, the shift register circuit 320 includes a plurality of shift registers (not shown). Each shift register included in shift register circuit 320 sequentially shifts a source start pulse (SSP) using a source sampling clock (SSC) and inputs the same to the first latch circuit 330.

The first latch circuit 330 includes a plurality of sampling latches (not shown). The sampling latches included in the first latch circuit 330 sample image data (RGB data) input in series from the timing controller 400 in synchronization with the SSP input from the shift register circuit 320 connected to each sampling latch.

The second latch circuit 340 includes a plurality of holding latches (not shown). The holding latches included in the second latch circuit 340 latch the sampled image data for each channel output from the first latch circuit 330 and output the same in synchronization with the rising edge of the latch enable signal Latch_En output from the latch enable signal output control circuit 341.

The latch enable signal output control circuit 341 generates and outputs a latch enable signal Latch_En for enabling the operation of the second latch circuit 340. Specifically, the latch enable signal output control circuit 341 outputs the latch enable signal Latch_En at a first timing according to the ARC, or outputs the latch enable signal at a second timing different from the first timing. In one example, the latch enable signal output control circuit 341 may output the latch enable signal Latch_En at the first timing when the ARC having the first value is received from the timing controller 400, and output the latch enable signal Latch_En at the second timing when the timing setting signal having the second value is received.

In one embodiment, the first timing may be included in a period during which the SOE is maintained at the high level, and the second timing may be included in a period during which the SOE is maintained at the low level.

For example, the first timing may be a time (rising edge) at which the SOE transitions from the low level to the high level or a time (falling edge) at which the last image data of the previous horizontal line is received. The second timing may be a time (falling edge) at which the SOE transitions from the high level to the low level or a time between the falling edge of the SOE and a time when the first image data of the current horizontal line is received.

In this case, information about the first timing and information about the second timing may be stored in a register (not shown). For example, upon receiving the ARC, the latch enable signal output control circuit 341 may check the value of the ARC and generate and output a latch enable signal so as to synchronize with the timing mapped to the value in the register.

For example, in the case where the first timing is mapped to the rising edge of the SOE and the second timing is mapped to the falling edge of the SOE in the register, the latch enable signal output control circuit 341 generates and outputs a latch enable signal Latch_En so as to synchronize with the rising edge of the SOE when the ARC is determined to have the first value. In addition, when the timing setting signal is determined to have the second value, the latch enable signal output control circuit 341 may generate and output a latch enable signal so as to synchronize with the falling edge of the SOE.

In the above-described embodiment, the ARC may be set to the first value when the noise of the DA converter 360 is greater than the power noise of the Mux circuit 380, and may be set to the second value when the power noise of the Mux circuit 380 is greater than the noise of the DA converter 360.

This operation is intended to reduce the noise of the DA converter 360 when the noise of the DA converter 360 is greater than the power noise of the Mux circuit 380 according to the characteristics of the display panel 100, by causing the output timing of the latch enable signal Latch_En to be synchronized with the rising edge of the SOE or the time when the last image data of the previous horizontal line is received, such that the output of the output buffer circuit 370 changes before the Mux circuit 380 is turned on.

Also, the operation is intended to reduce the power noise of the Mux circuit 380 when the power noise of the Mux circuit 380 is greater than the noise of the DA converter 360 by causing the output timing of the latch enable signal Latch_En to be synchronized with the falling edge of the SOE at which the Mux circuit 380 is turned on, or to be synchronized with a time after a predetermined time from the falling edge of the SOE, such that the output of the output buffer circuit 370 changes after the Mux circuit 380 is turned on.

The level shifter circuit 350 includes a plurality of level shifters (not shown). Each level shifter included in the level shifter circuit 350 shifts the voltage level of the image data that are output from the second latch circuit 340 simultaneously. At this time, the level shifter circuit 350 operates in synchronization with the rising edge of the latch enable signal Latch_En as in the case of the second latch circuit 340 because the second latch circuit 340 outputs image data by the latch enable signal Latch_En.

The DA converter 360 includes a plurality of DA converters (not shown). Each DA converter converts image data for each channel with a shifted voltage level into an analog data voltage using a reference gamma voltage generated by a gamma voltage generation circuit (not shown).

In one embodiment, the DA converter 360 may convert the image data output from the level shifter circuit 350 into a positive or negative polarity data voltage and output the data voltage. To this end, the DA converter 360 may include a plurality of positive DA converters (not shown) and a plurality of negative DA converters (not shown).

The gamma voltage generation circuit (not shown) uses a resistor string to generate a plurality of gradient voltages for outputting image data for each channel, and supplies the generated gradient voltages to the DA converter 360.

The output buffer circuit 370 includes a plurality of output buffers (not shown). Each output buffer included in the output buffer circuit 370 amplifies the data voltage for each channel converted by the DA converter 360 and outputs the amplified data voltage to the Mux circuit 380. At this time, the second latch circuit 340 outputs image data in synchronization with the rising edge of the latch enable signal Latch_En, and accordingly the output buffer circuit 370 also amplifies and outputs the data voltage in synchronization with the rising edge of the latch enable signal Latch_En.

In one embodiment, the output buffer circuit 370 may amplify data voltage of positive or negative polarity output from the DA converter 360 and output the amplified data voltage to the Mux circuit 380. To this end, the output buffer circuit 370 may include a plurality of positive amplifiers (not shown) and a plurality of negative amplifiers (not shown).

Figure 4:
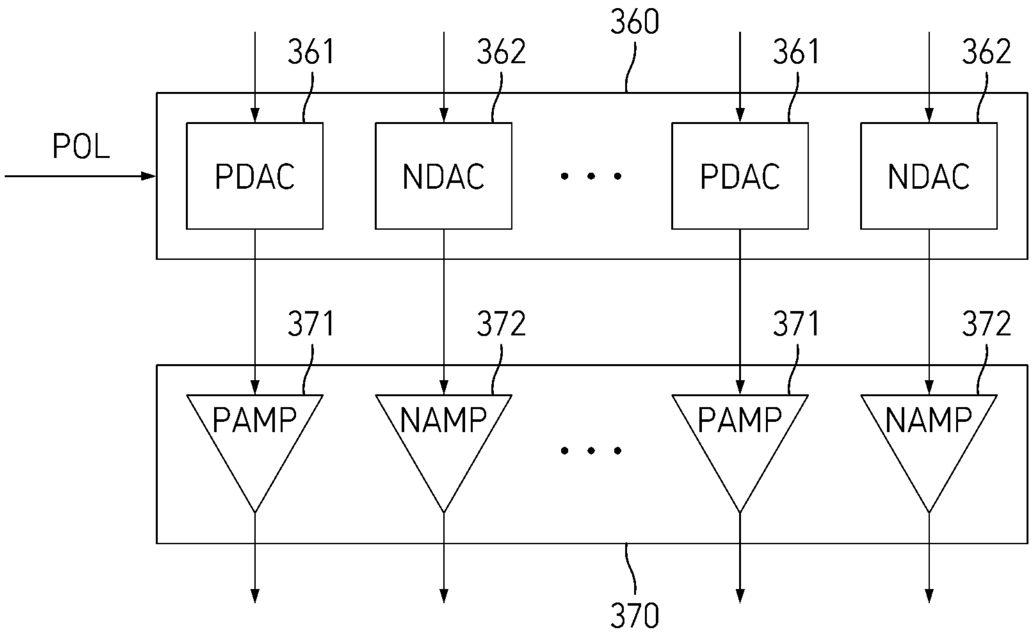
FIG. 4 is a block diagram schematically illustrating a configuration of a digital-to-analog converter and an output buffer circuit of a source driver IC according to one embodiment of the present disclosure.

FIG. 4 is a block diagram schematically illustrating a configuration of a digital-to-analog converter and an output buffer circuit of a source driver IC according to one embodiment of the present disclosure.

As shown in FIG. 4, the DA converter 360 may include a plurality of positive DA converters (PDACs) 361 and negative DA converters (NDACs) 362.

Specifically, the PDACs 361 may generate a positive data voltage in synchronization with a polarity signal (POL) at the high level and output the same to the output buffer circuit 370, and the NDACs 362 may generate a negative data voltage in synchronization with a POL at the low level and output the same to the output buffer circuit 370.

Further, the output buffer circuit 370 may include a plurality of positive amplifiers (PAMPs) 371 and negative amplifiers (NAMPs) 372.

Specifically, the PAMPs 371 may amplify the positive data voltages output from the PDACs 361 and output the amplified voltages to the Mux circuit 380, and the NAMP 372 may amplify the negative data voltages output from the NDACs 362 and output the amplified voltages to the Mux circuit 380.

Referring back to FIG. 2, the Mux circuit 380 includes a plurality of switching elements (not shown). The plurality of switching elements (not shown) included in the Mux circuit 380 outputs the data voltage output from the output buffer circuit 370 to the pixels of the display panel 100 via the data lines DL according to a control signal.

In one embodiment, the Mux circuit 380 may select a positive or negative data voltage output from the output buffer circuit 370 and output the same to the data line DL of the display panel 100 connected to each channel. Thereby, the Mux circuit 380 may output different polarities of data voltages for the respective channels.

The control signal generation circuit 381 generates and outputs a polarity control signal or an SOE based on the information received from the timing controller 400. In one embodiment, when a CEDS-based interface is employed, the control signal generation circuit 381 generates a polarity control signal based on POL information contained in a control packet received from the timing controller 400, and generates and outputs an SOE based on SOE_Start and SOE_End information.

In other embodiments, the polarity control signal or the SOE may be received directly from the timing controller 400 through the reception circuit 310.

The charge share circuit 382 is connected to the output of Mux circuit 380 and performs charge sharing by selectively connecting two different data lines according to the charge share control signal.

The C/S mode is an operation mode in which adjacent data lines are shorted such that charge sharing is implemented before the data voltage is output. In this mode, when the polarity of the data voltage applied to each pixel is reversed for each horizontal line, poor display due to horizontal crosstalk or afterimage may be prevented, and operation can be performed at low power, which may reduce power consumption.

The mode control circuit 383 controls the operation of the Mux circuit 380 and the charge share circuit 382 according to the operation mode.

In one embodiment, when the operation mode is the C/S mode, the mode control circuit 383 may turn off the Mux circuit 380 and turn on the charge share circuit 382 during the high-level period of the SOE. Further, when the operation mode is a Hi-Z mode, the mode control circuit 383 may turn off the Mux circuit 380 and turn on the charge share circuit 382 during the high-level portion of the SOE. Also, when the operation mode is the driving mode, the mode control circuit 383 may turn on the Mux circuit 380 and turn off the charge share circuit 382 during the high-level period of the SOE.

Figure 5:
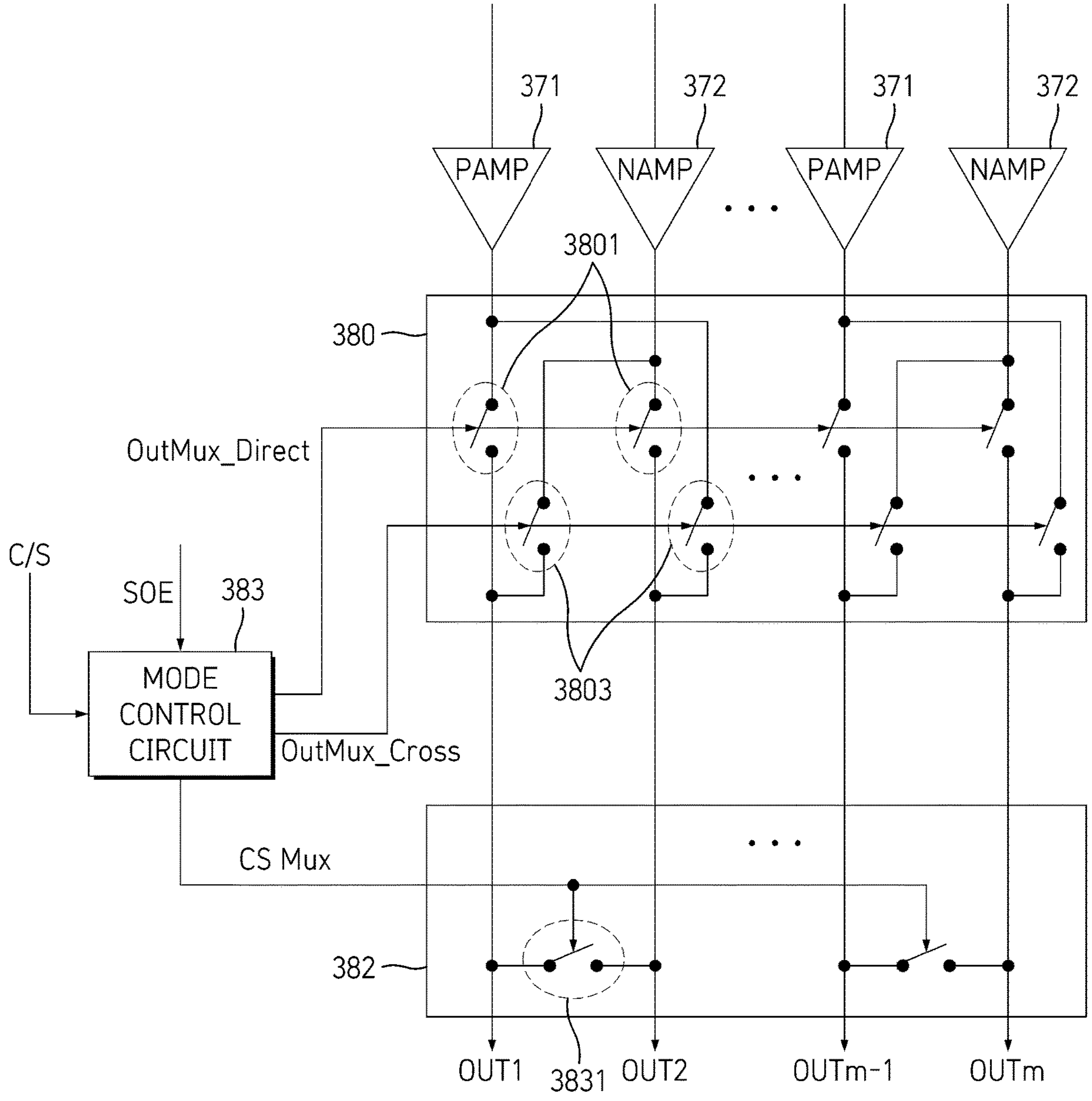
FIG. 5 is a block diagram schematically illustrating an example of a Mux circuit and a charge share circuit of a source driver IC according to one embodiment of the present disclosure.
Figure 6:
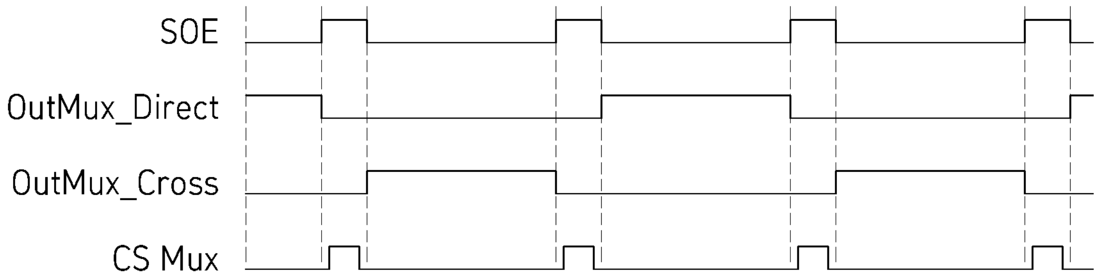
FIG. 6 is a timing diagram of control signals for controlling the Mux circuit and charge share circuit shown in FIG. 5.

FIG. 5 is a block diagram schematically illustrating an example of a Mux circuit and a charge share circuit of a source driver IC according to one embodiment of the present disclosure, and FIG. 6 is a timing diagram of control signals for controlling the Mux circuit and charge share circuit shown in FIG. 5.

As shown in FIGS. 5 and 6, the Mux circuit 380 may include a plurality of switching elements 3801 and 3803 that are turned on and off in response to a control signal. Specifically, the Mux circuit 380 may include a first switching elements 3801 that are turned on during the high-level period of a first mux control signal OutMux_Direct to cause data voltages output by the PAMPs 371 and NAMPs 372 to be output to the respective channels, a second switching elements 3803 that are turned on during the high-level period of a second mux control signal OutMux_Cross to cause the data voltages output by the PAMPs 371 and NAMP 372 to be crossed and output to an adjacent channel. In this case, the first switching elements 3801 and the second switching elements 3803 may operate complementarily to each other during periods when the SOE is at the low level. In other words, the second switching elements 3803 are turned off when the first switching elements 3801 are turned on during the periods when the SOE is at the low level. Also, the second switching elements 3803 are turned on when the first switching elements 3801 are turned off.

The charge share circuit 382 is connected to the output terminal of the Mux circuit 380, and may perform the charge sharing by selectively connecting two adjacent channels OUT1 and OUT2 during the high-level period of the charge share control signal CS Mux received from the mode control circuit 383. Specifically, the third switching element 3831 included in the charge share circuit 382 is turned on during the high-level period of the charge share control signal CS Mux to cause the two adjacent channels OUT1 and OUT2 to be shorted, such that the C/S is performed between the two channels OUT1 and OUT2.

The mode control circuit 383 may generate the first mux control signal OutMux_Direct, the second mux control signal OutMux_Cross, and the charge share control signal CS Mux using the SOE according to the operation mode. Here, the mode control circuit 383 may receive information (C/S, ARC, etc.) related to the operation mode from the timing controller 400 through the reception circuit 310.

For example, when the operation mode is the C/S mode under the normal operation type, the mode control circuit 383 generates a first mux control signal OutMux_Direct, a second mux control signal OutMux_Cross, and a charge share control signal CS Mux such that the Mux circuit 380 is turned off and the charge share circuit 382 is turned on during the high-level period of the SOE, as shown in FIG. 6. Also, the mode control circuit 383 generates the first mux control signal OutMux_Direct, the second mux control signal OutMux_Cross, and the charge share control signal CS Mux such that the charge share circuit 382 is turned off and the first and second switching elements 3801 and 3802 included in the Mux circuit 380 are alternately turned on during the low-level period of the SOE.

When the operation mode is Hi-Z mode under the normal operation type, the mode control circuit 383 may output the first and second Mux control signals OutMux_Direct and OutMux_Cross of the low level and the charge share control signal CS Mux of the low level during the low-level period of the SOE such that the Mux circuit 380 is turn off and the charge share circuit 382 is turn off during the high-level period of the SOE.

When the operation mode is the driving mode under the normal operation type, the mode control circuit 383 may alternately output the first and second Mux control signals OutMux_Direct and OutMux_Cross such that the Mux circuit 380 is turned on regardless of the SOE, and may output the charge share control signal CS Mux of the low level such that the charge share circuit 382 is turned off.

In the case where a control packet received through the CEDS contains control information (C/S) about charge sharing during operation in the driving mode under the ARC operation type, the mode control circuit 383 may output control signals such that the Mux circuit 380 is turned off and the charge share circuit 382 is turned on during the high-level period of the SOE to enable the charge sharing to be performed during the period. Accordingly, the charge sharing cannot be performed when the SDIC operates in the driving mode under the normal operation type, but may be performed when the SDIC operates in the driving mode under the ARC operation type. Thereby, power consumption may be reduced.

The configuration of the Mux circuit 380 and the charge share circuit 382 and the timing diagram of the control signals shown in FIGS. 5 and 6 is an example of vertical-1 dot inversion when the display panel 100 is a liquid crystal display panel. The SDIC according to the present disclosure is not limited thereto. The Mux circuit 380 and the charge share circuit 382 can be configured in various ways depending on the inversion method, and the timing of the control signals that control the same may also be changed.

Hereinafter, the operation of the SDIC in each operation mode under each operation type will be described with reference to FIGS. 7 to 11.

Figure 7:
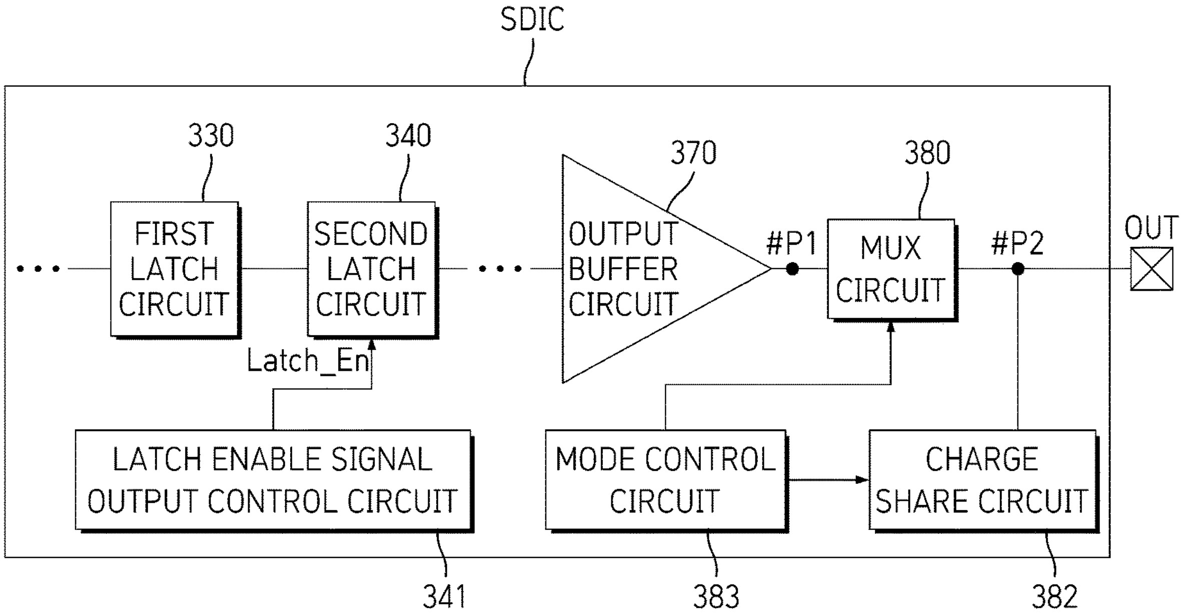
FIG. 7 is a schematic diagram illustrating the operation of components included in a source driver IC according to one embodiment of the present disclosure.
Figure 8:
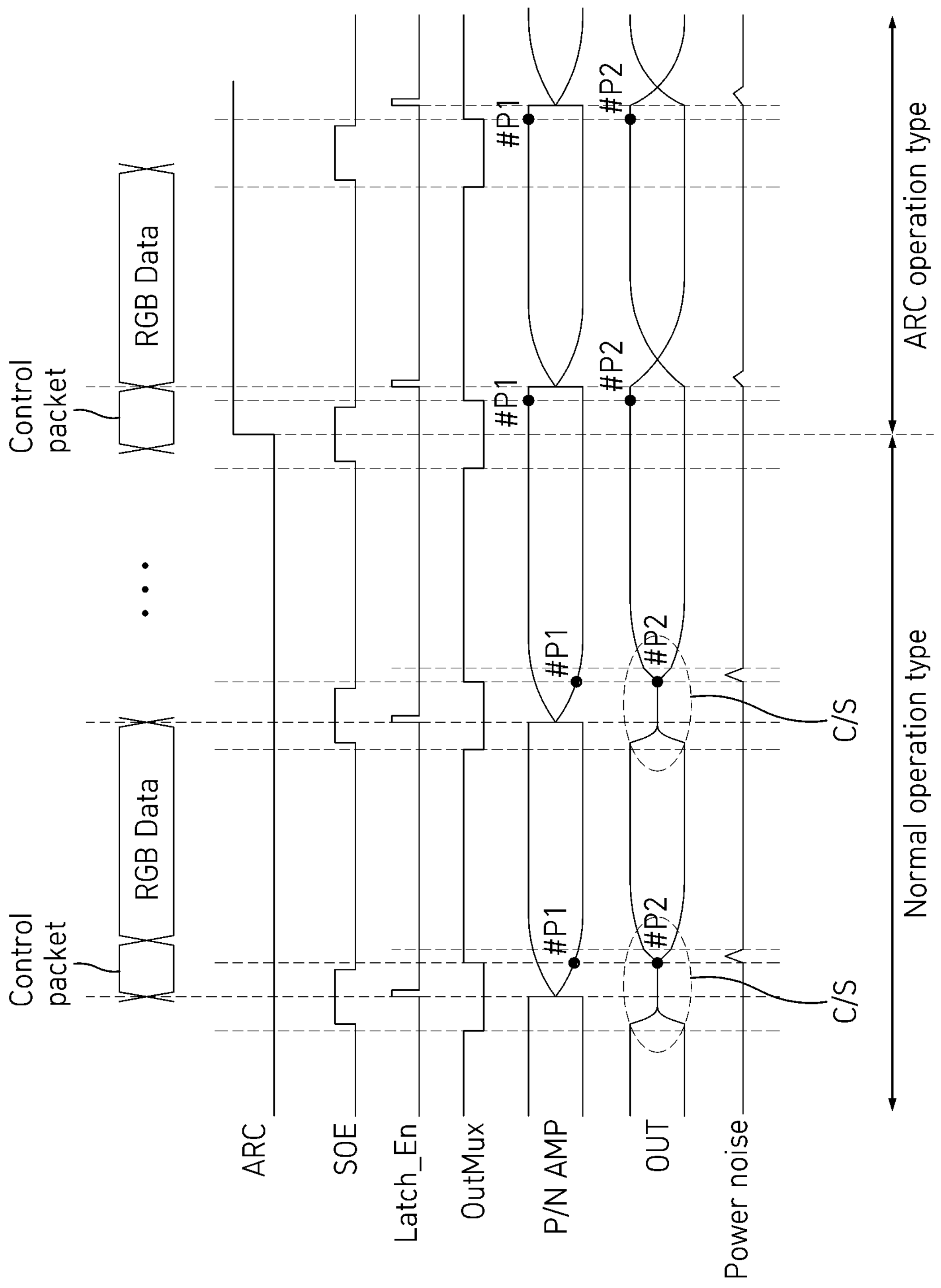
FIG. 8 is a waveform diagram depicting the operation of a source driver IC according to one embodiment of the present disclosure when the source driver IC switches to an ARC operation type while operating in a charge sharing mode under a normal operation type.
Figure 9:
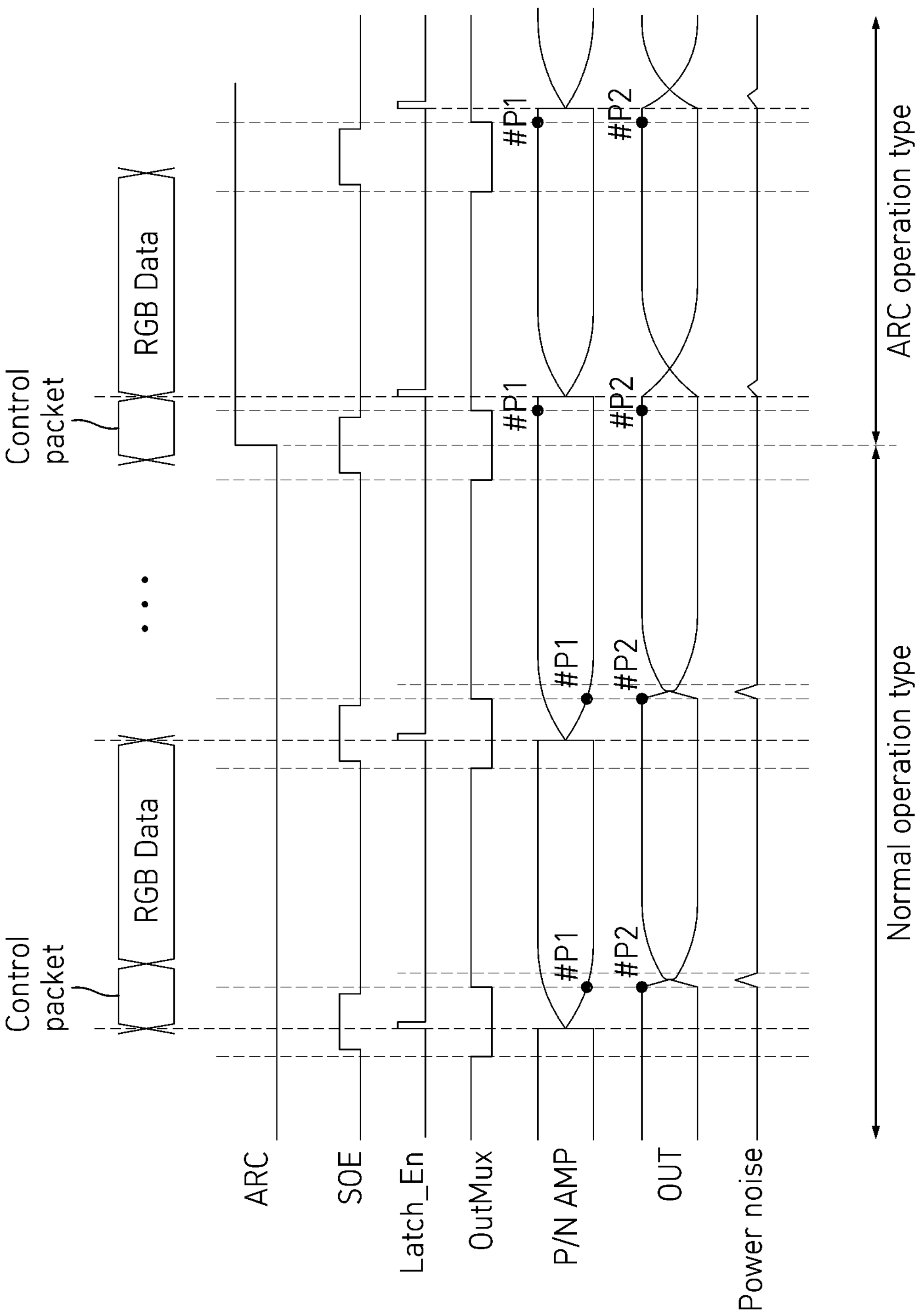
FIG. 9 is a waveform diagram depicting the operation of a source driver IC according to one embodiment of the present disclosure when the source driver IC switches to an ARC operation type while operating in a high-g mode under a normal operation type.
Figure 10:
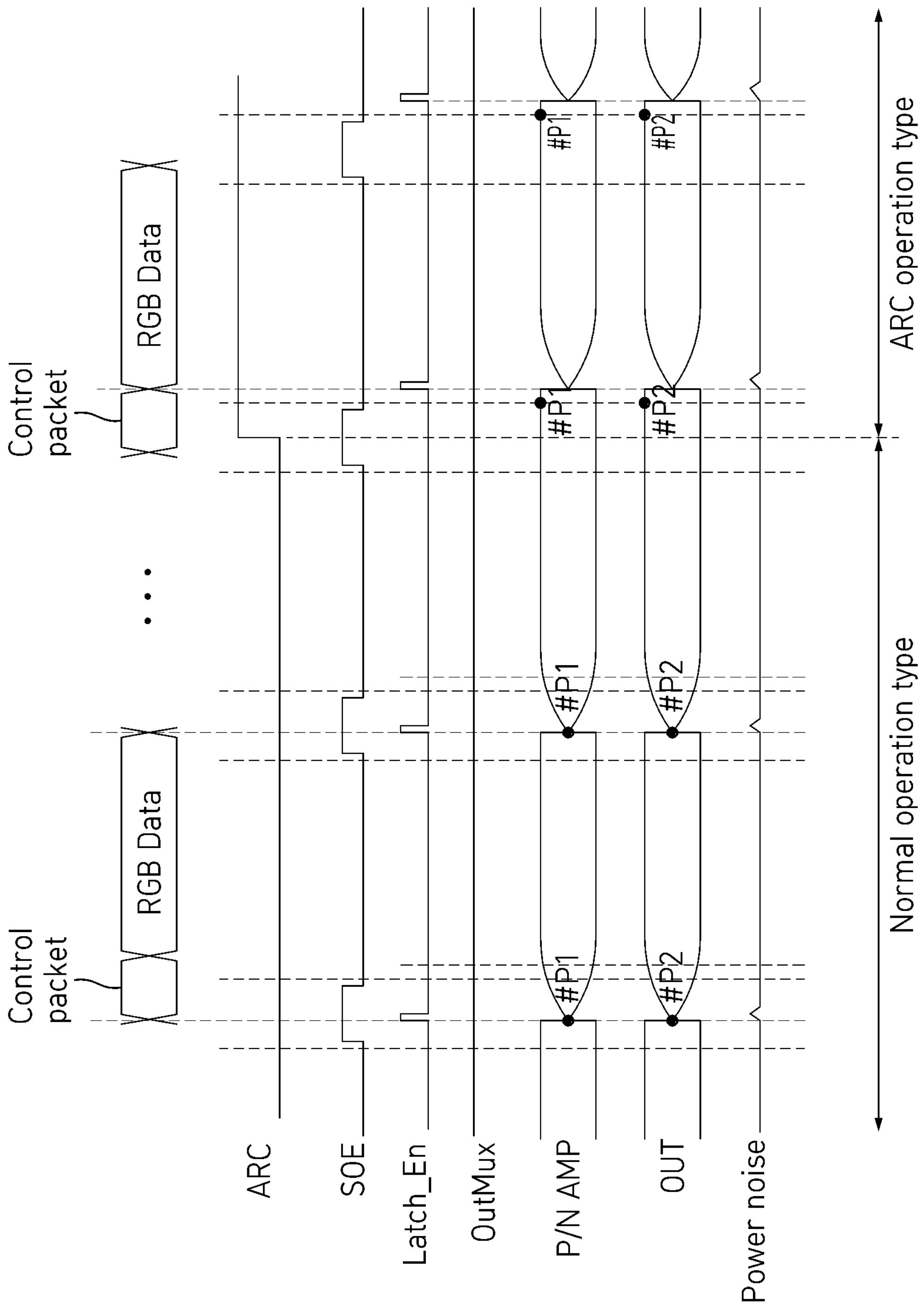
FIG. 10 is a waveform diagram depicting the operation of a source driver IC according to one embodiment of the present disclosure when the source driver IC switches to an ARC operation type while operating in a driving mode under a normal operation type.
Figure 11:
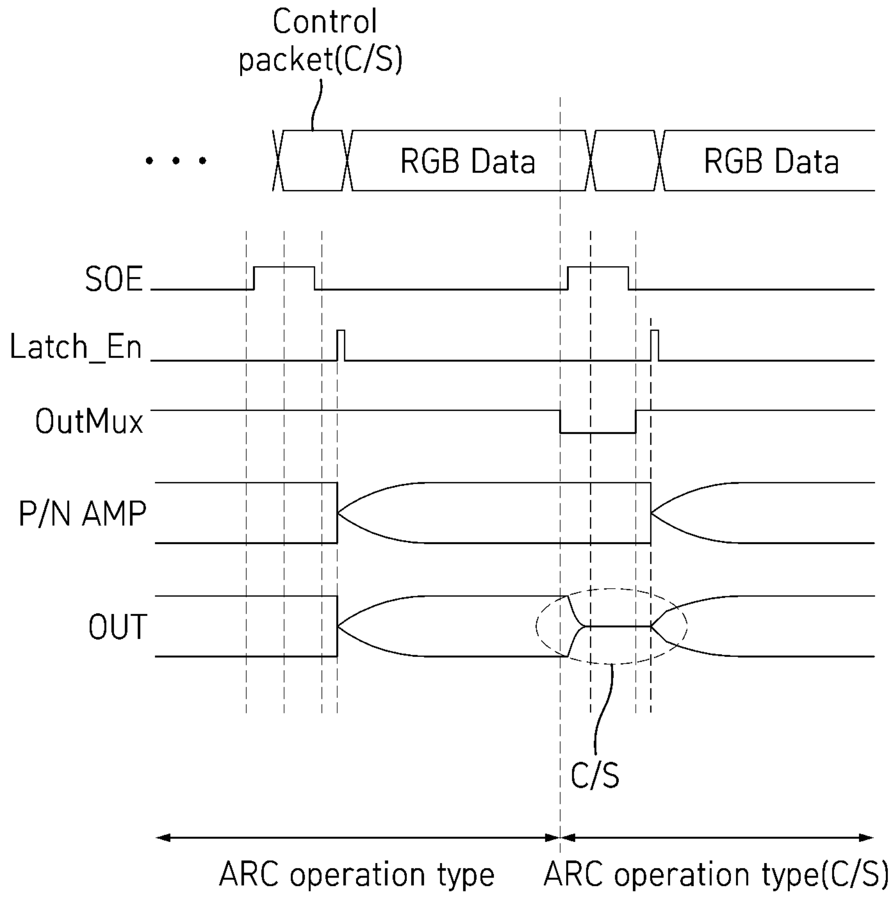
FIG. 11 is a waveform diagram depicting an example in which charge sharing is performed while a source driver IC according to one embodiment of the present disclosure is operating in a driving mode under the ARC driving type.

FIG. 7 is a schematic diagram illustrating the operation of components included in a source driver IC according to one embodiment of the present disclosure. FIG. 8 is a waveform diagram depicting the operation of a source driver IC according to one embodiment of the present disclosure when the source driver IC switches to an ARC operation type while operating in a charge sharing mode under a normal operation type. FIG. 9 is a waveform diagram depicting the operation of a source driver IC according to one embodiment of the present disclosure when the source driver IC switches to an ARC operation type while operating in a high-g mode under a normal operation type. FIG. 10 is a waveform diagram depicting the operation of a source driver IC according to one embodiment of the present disclosure when the source driver IC switches to an ARC operation type while operating in a driving mode under a normal operation type. FIG. 11 is a waveform diagram depicting an example in which charge sharing is performed while a source driver IC according to one embodiment of the present disclosure is operating in a driving mode under the ARC driving type.

When a timing setting signal (ARC) having a first value (low level) is received, the SDIC according to the present disclosure operates under the normal operation type, as shown in FIGS. 8 to 10. Accordingly, the latch enable signal output control circuit 341 outputs a latch enable signal Latch_En in synchronization with the time when the last image data among the image data of the previous horizontal line is received. Further, the mode control circuit 383 may control the Mux circuit 380 and the charge share circuit 382 according to the C/S mode, Hi-Z mode, and driving mode, which are operation modes, based on the latch enable signal Latch_En and the SOE.

Specifically, as shown in FIGS. 8 to 10, when the SDIC is operating in the C/S mode, the Hi-Z mode, and the driving mode under the normal operation type, the second latch circuit 340, the level shifter circuit 350, the DA converter 360, and the output buffer circuit 370 operate at the rising edge of the latch enable signal Latch_En output in synchronization with the time when the last image data among the image data of the previous horizontal line is received.

While the latch enable signal Latch_En is illustrated in FIGS. 8 to 10 as being output at a time when the reception of the last data among the image data of a horizontal line is completed, the latch enable signal Latch_En may be output in synchronization with the rising edge of the source output enable signal (SOE).

As shown in FIG. 8, when the SDIC operates in the C/S mode under the normal operation type, the Mux circuit 380 is turned off by the Mux control signals OutMux_Direct and OutMux_Cross at the rising edge of the SOE and turned on by the Mux control signals OutMux_Direct and OutMux-_Cross at the falling edge of the SOE. Further, the charge share circuit 382 may be turned on by the charge share control signal CS Mux at the rising edge of the SOE and turned off by the charge share control signal CS Mux at the falling edge of the SOE. In other words, during the high-level period of the SOE, the Mux circuit 380 may be turned off and the charge share circuit 382 may be turned on, such that the C/S may be performed, as shown in FIG. 8.

As shown in FIG. 9, when the SDIC is operating in the Hi-Z mode under normal operation type, both the Mux circuit 380 and the charge share circuit 382 are turned off during the period when the SOE is at the high level, such that each channel is in a floating state and the previously supplied data voltage is maintained.

As shown in FIG. 10, when the SDIC is operating in the driving mode under normal operation type, the Mux circuit 380 is kept turned on and the charge share circuit 382 is kept turned off, such that the data voltage is supplied to the corresponding channel either directly or by crossing.

As illustrated in FIGS. 8 and 9 above, in the C/S mode and Hi-Z mode under the normal operation type, the time when the data voltage of the output buffer circuit 370 is output in synchronization with to the rising edge of the latch enable signal Latch_En is earlier than the time when the Mux circuit 380 is turned on synchronization with the falling edge of the SOE. Accordingly, there may be a voltage difference between the output voltage #P1 of the output buffer circuit 370 and the output voltage #P2 of the Mux circuit 380, which may lead to power noise.

Furthermore, as shown in FIG. 10, in the driving mode under the normal operation type, the Mux circuit 380 remains turned on without being synchronized to the SOE, and thus there is no voltage difference between the output voltage #P1 of the output buffer circuit 370 and the output voltage #P2 of the Mux circuit 380. However, the Mux circuit 380 cannot be turned off, and therefore the C/S, which is a low power operation, cannot be performed.

However, in the driving mode under the ARC operation type, charge sharing may be performed because the Mux circuit 380 can be turned off and the charge share circuit 382 can be turned on during the period when the SOE is at the high level according to the charge sharing control information (C/S) included in the control packet as shown in FIG. 11. Accordingly, the SDIC according to the present disclosure may perform charge sharing during the period when the SOE is at the high level, even in the driving mode under the ARC operation type, thereby enabling low power implementation. In the driving mode under the ARC operation type, the Mux circuit 380 may be turned on and the charge share circuit 382 may be turned off during the period when the SOE is at the low level. Thus, the data voltage may be supplied directly or crossed to the corresponding channel.

The SDIC according to the present disclosure may operate according to the ARC operation type when the ARC having the second value (high level) is received while operating under the normal operation type, as shown in FIGS. 8 to 10. Accordingly, the second latch circuit 340 may be enabled at the rising edge of the latch enable signal Latch_En output in synchronization with the falling edge of the SOE (or at a time after a predetermined margin from the falling edge), and the level shifter circuit 350, the DA converter 360, and the output buffer circuit 370 may also operate in synchronization with the rising edge of the latch enable signal Latch_En.

In FIGS. 8 to 10, a predetermined margin is shown to be present between the rising edge of the latch enable signal Latch_En and the falling edge of the SOE, because a certain amount of time may be required for the data voltage output from the Mux circuit 380 to be equal to the data voltage output from the output buffer circuit 370 after the Mux circuit 380 is turned on. As another example, the rising edge of the latch enable signal Latch_En may be synchronized with the falling edge of the SOE without a margin.

As shown in FIGS. 8 to 10, in each operation mode under the ARC operation type according to the present disclosure, the timing of the output of the latch enable signal Latch_En is synchronized with the turn-on time of the Mux circuit 380 (the falling edge of the SOE), such that the output voltage #P1 of the output buffer circuit 370 and the output voltage #P2 of the Mux circuit 380 may become the same at the turn-on time of the Mux circuit 380 to minimize power noise. Even when operating in the driving mode, the Mux circuit 380 may be turned off during the period when the SOE is at the high level, thereby enabling charge sharing and reducing power consumption.

Hereinafter, a method of driving an SDIC according to the present disclosure will be described with reference to FIG. 12.

Figure 12:
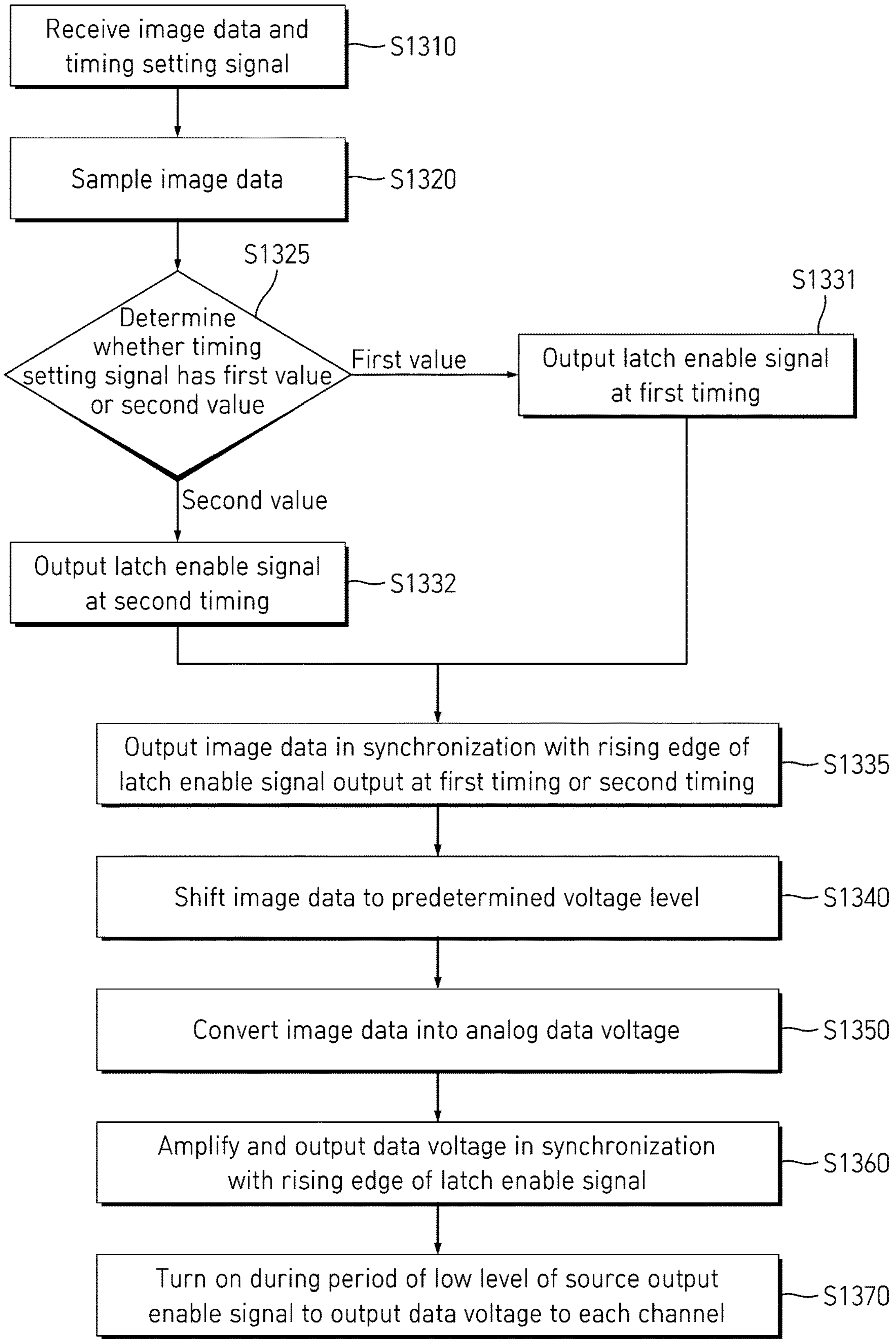
FIG. 12 is a flowchart illustrating a method for driving a source driver IC according to one embodiment of the present disclosure.

FIG. 12 is a flowchart illustrating a method for driving an SDIC according to one embodiment of the present disclosure.

First, a reception circuit receives image data and a timing setting signal from a timing controller (S1310).

In one embodiment, the reception circuit may receive, from the timing controller, a timing setting signal (ARC) for setting the output timing of the latch enable signal to either a first timing or a second timing.

In one example, the ARC may be implemented in the form of a flag having a first value (low level) or a second value (high level). For example, when the ARC is a flag having the first value, the output timing of the latch enable signal may be set to the first timing. When the ARC is a flag having the second value, the output timing of the latch enable signal may be set to the second timing.

In one embodiment, the first timing may be included in a period during which the SOE is maintained at the high level, and the second timing may be included in a period during which the SOE is maintained at the low level.

For example, the first timing may be a time (rising edge) at which the SOE transitions from the low level to the high level or a time (falling edge) at which the last image data of the previous horizontal line is received. The second timing may be a time (falling edge) at which the SOE transitions from the high level to the low level or a time between the falling edge of the SOE and a time when the first image data of the current horizontal line is received. In this case, information about the first timing and information about the second timing may be stored in a register (not shown).

Next, a first latch circuit samples the image data (S1320). In one embodiment, the first latch circuit may sample the image data (RGB data) input in series from the timing controller in synchronization with the SSP input from the shift register circuit connected to each sampling latch.

Next, the latch enable signal output control circuit analyzes the ARC to determine whether the ARC has the first value or the second value (S1325). The latch enable signal output control circuit outputs a latch enable signal Latch_En at the first timing when it is determined that the ARC has the first value (S1331), and outputs the latch enable signal Latch_En at the second timing when it is determined that the ARC has the second value (S1332). Outputting the latch enable signal Latch_En at the first timing is defined as a normal operation type. Outputting the latch enable signal Latch_En at the second timing is defined as an ARC operation type.

Next, the second latch circuit outputs image data in synchronization with the rising edge of the latch enable signal Latch_En output at the first timing or the second timing (S1335).

In one embodiment, the holding latches included in the second latch circuit may latch the sampled image data for each channel output from the first latch circuit and output the same at the rising edge of the latch enable signal Latch_En output at the first timing or the second timing by the latch enable signal output control circuit.

Next, the level shifter circuit shifts the image data output from the second latch circuit to a predetermined voltage level (S1340), and the DA converter converts the image data output from the level shifter circuit into an analog data voltage (S1350). In one embodiment, the DA converter may convert the image data into a positive or negative data voltage and output the voltage.

Next, the output buffer circuit amplifies and outputs the data voltage in synchronization with the rising edge of the latch enable signal Latch_En (S1360). In one embodiment, the output buffer circuit may amplify and output a positive or negative data voltage output from the DA converter.

Next, the Mux circuit is turned on during a period when the SOE is at the low level to output the data voltage output from the output buffer circuit to each channel (S1370).

In the normal operation type under which the output timing of the latch enable signal Latch_En is synchronized with the rising edge of the SOE or the time when the last image data of the previous horizontal line is received, the output of the output buffer circuit is changed before the Mux circuit is turned on. Thereby, noise of the DA converter may be reduced.

On the other hand, in the ARC operation type under which the output timing of the latch enable signal Latch_En is synchronized with the falling edge of the SOE, which is the time when the Mux circuit is turned on, or with a time after a predetermined time from the falling edge of the SOE, the output of the output buffer circuit is changed after the Mux circuit is turned on. Thereby, the power noise of the Mux circuit may be reduced.

Although not shown in FIG. 12, under the normal operation type or the ARC operation type, during the period when the SOE is at the high level, the Mux circuit may be turned off and the charge share circuit may be turned on to perform charge sharing. Alternatively, both the Mux circuit and the charge share circuit may be turned off during the period when the SOE is at the high level to operate in the Hi-Z mode.

In addition, when the operation mode under the normal operation type is the driving mode, the Mux circuit is turned on even during the period when the source output enable signal is at the high level, and thus charge sharing cannot be performed. However, in the case where the operation mode under the ARC operation type is the driving mode, the Mux circuit may be turned off during the period when the SOE is at the high level if the charge sharing information (C/S) is included in the control packet, and thus charge sharing may be performed, allowing for low power implementation.

It will be appreciated by those skilled in the art to which the present disclosure belongs that the disclosure described above can be practiced in other specific forms without altering its technical ideas or essential features.

For example, while the output timing of the latch enable signal has been described as changeable during operation of the display device in the embodiments described above, the output timing of the latch enable signal may be fixedly preset to either the first timing or the second timing depending on the characteristics of the display panel in other embodiments.

Further, the methods described herein may be implemented, at least in part, using one or more computer programs or components. The components may be provided as a set of computer instructions on a computer-readable medium including volatile and non-volatile memories or on a machine-readable medium. The instructions may be provided as software or firmware and may be implemented, in whole or in part, in hardware configurations such as ASICs, FPGAs, DSPs, or other similar devices. The instructions may be configured to be executed by one or more processors or other hardware components, wherein the processors or other hardware components perform or are enabled to perform all or a part of the methods and procedures disclosed herein when executing the set of computer instructions.

It should therefore be understood that the embodiments described above are exemplary and non-limiting in all respects. The scope of the present disclosure is defined by the appended claims, rather than by the detailed description above, and should be construed to cover all modifications or variations derived from the meaning and scope of the appended claims and the equivalents thereof.

What is claimed is:

1. A source driver integrated circuit (IC) comprising:

a first latch circuit configured to sample image data;

a second latch circuit configured to output the sampled image data according to a latch enable signal;

a latch enable signal output control circuit configured to output the latch enable signal at a first timing or at a second timing different from the first timing according to a timing setting signal;

a digital-to-analog converter configured to convert the image data output from the second latch circuit into an analog data voltage;

an output buffer circuit configured to amplify and output the data voltage according to the latch enable signal; and a multiplexer (Mux) circuit configured to be turned on during a period of a first level of a source output enable signal to output the data voltage output from the output buffer circuit to each of a plurality of channels, wherein the timing setting signal contains a flag having one of a first value or a second value, wherein the latch enable signal output control circuit is configured to output the latch enable signal at the first timing when the timing setting signal having the first value is received, and output the latch enable signal at the second timing when the timing setting signal having the second value is received, and wherein the flag is set to the first value or the second value based on a comparison between a noise of the digital-to-analog converter and a noise of the Mux circuit.

2. The source driver IC of claim 1, wherein the first timing is a time at which the output buffer circuit outputs the data voltage before a time when the Mux circuit is turned on, and wherein the second timing is a time when the output buffer circuit outputs the data voltage after the time when the Mux circuit is turned on.

3. The source driver IC of claim 2, further comprising:

a charge share circuit connected to an output terminal of the Mux circuit and configured to perform charge sharing by selectively connecting two different data lines according to a charge share control signal; and a mode control circuit configured to control the Mux circuit and the charge share circuit according to an operation mode.

4. The source driver IC of claim 3, wherein the mode control circuit is configured to:

based on the operation mode being a charge sharing mode, turn off the Mux circuit and turn on the charge share circuit during a period of a second level of the source output enable signal; and based on the operation mode being a Hi-Z mode, turn off the Mux circuit and the charge share circuit during the period of the second level of the source output enable signal.

5. The source driver IC of claim 3, wherein the mode control circuit is configured to:

based on that the timing setting signal has a first value and the operation mode is a driving mode, turn on the Mux circuit and turn off the charge share circuit during a period of a second level of the source output enable signal to output the data voltage output from the output buffer circuit to each of the plurality of channels, and based on that the timing setting signal has a second value and the operation mode is the driving mode, turn off the Mux circuit and turn on the charge share circuit during the period of the second level of the source output enable signal to enable charge sharing to be performed.

6. The source driver IC of claim 1, wherein, based on the noise of the digital-to-analog converter being greater than the noise of the Mux circuit, the flag is set to the first value, and wherein, based on the noise of the Mux circuit being greater than the noise of the digital-to-analog converter, the flag is set to the second value.

7. The source driver IC of claim 1, wherein the first timing is included in a period during which the source output enable signal is maintained at a second level, and wherein the second timing is included in a period during which the source output enable signal is maintained at the first level.

8. The source driver IC of claim 1, wherein the first timing corresponds to a rising edge of the source output enable signal or a time when reception of last image data among the image data of a previous horizontal line is completed.

9. The source driver IC of claim 1, wherein the second timing corresponds to a falling edge of the source output enable signal or a time between the falling edge of the source output enable signal and a time when reception of first image data among the image data of a current horizontal line is completed.

10. The source driver IC of claim 1, further comprising: a register configured to store information about the first timing and information about the second timing.

11. The source driver IC of claim 1, further comprising: a pin configured to receive the timing setting signal.

12. The source driver IC of claim 1, wherein the flag is received in a control packet transmitted by clock embedded differential signaling (CEDS).

13. A method for driving a source driver integrated circuit (IC), the method comprising:

receiving image data and a timing setting signal by a reception circuit;

sampling the image data by a first latch circuit;

outputting, by a latch enable signal output control circuit, a latch enable signal at a first timing or at a second timing different from the first timing according to the timing setting signal;

outputting, by a second latch circuit, the image data according to the latch enable signal output at the first timing or the second timing;

converting, by a digital-to-analog converter, the image data output from the second latch circuit into an analog data voltage;

amplifying and outputting, by an output buffer circuit, the data voltage according to the latch enable signal; and turning on a multiplexer (Mux) circuit during a period of a first level of a source output enable signal to output the data voltage output from the output buffer circuit to each of a plurality of channels, wherein the timing setting signal contains a flag having one of a first value or a second value, wherein the latch enable signal output control circuit is configured to output the latch enable signal at the first timing when the timing setting signal having the first value is received, and output the latch enable signal at the second timing when the timing setting signal having the second value is received, and wherein the flag is set to the first value or the second value based on a comparison between a noise of the digital-to-analog converter and a noise of the Mux circuit.

14. The method of claim 13, wherein the first timing is a time at which the output buffer circuit outputs the data voltage before a time when the Mux circuit is turned on, and wherein the second timing is a time when the output buffer circuit outputs the data voltage after the time when the Mux circuit is turned on.

15. The method of claim 13, wherein the first timing corresponds to a rising edge of the source output enable signal or a time when reception of last image data among the image data of a previous horizontal line is completed.

16. The method of claim 13, wherein the second timing corresponds to a falling edge of the source output enable signal or a time between the falling edge of the source output enable signal and a time when reception of first image data among the image data of a current horizontal line is completed.

17. The method of claim 13, further comprising:

based on an operation mode being a charge sharing mode, turning off the Mux circuit and turning on a charge share circuit during a period of a second level of the source output enable signal to perform charge sharing; and based on the operation mode being a Hi-Z mode, turn off the Mux circuit and the charge share circuit during the period of the second level of the source output enable signal.

18. The method of claim 13, further comprising:

based on that the timing setting signal has a first value and an operation mode is a driving mode, turning on the Mux circuit and turning off the charge share circuit during a period of a second level of the source output enable signal to output the data voltage output from the output buffer circuit to each of the plurality of channels, and based on that the timing setting signal has a second value and the operation mode is the driving mode, turning off the Mux circuit and turning on the charge share circuit during the period of the second level of the source output enable signal to perform charge sharing.

* * * * *